July 13, 1965
G. R. LAMBERT
3,194,604
BRUSH TRIMMER
Filed Aug. 5, 1963
2 Sheets-Sheet 1
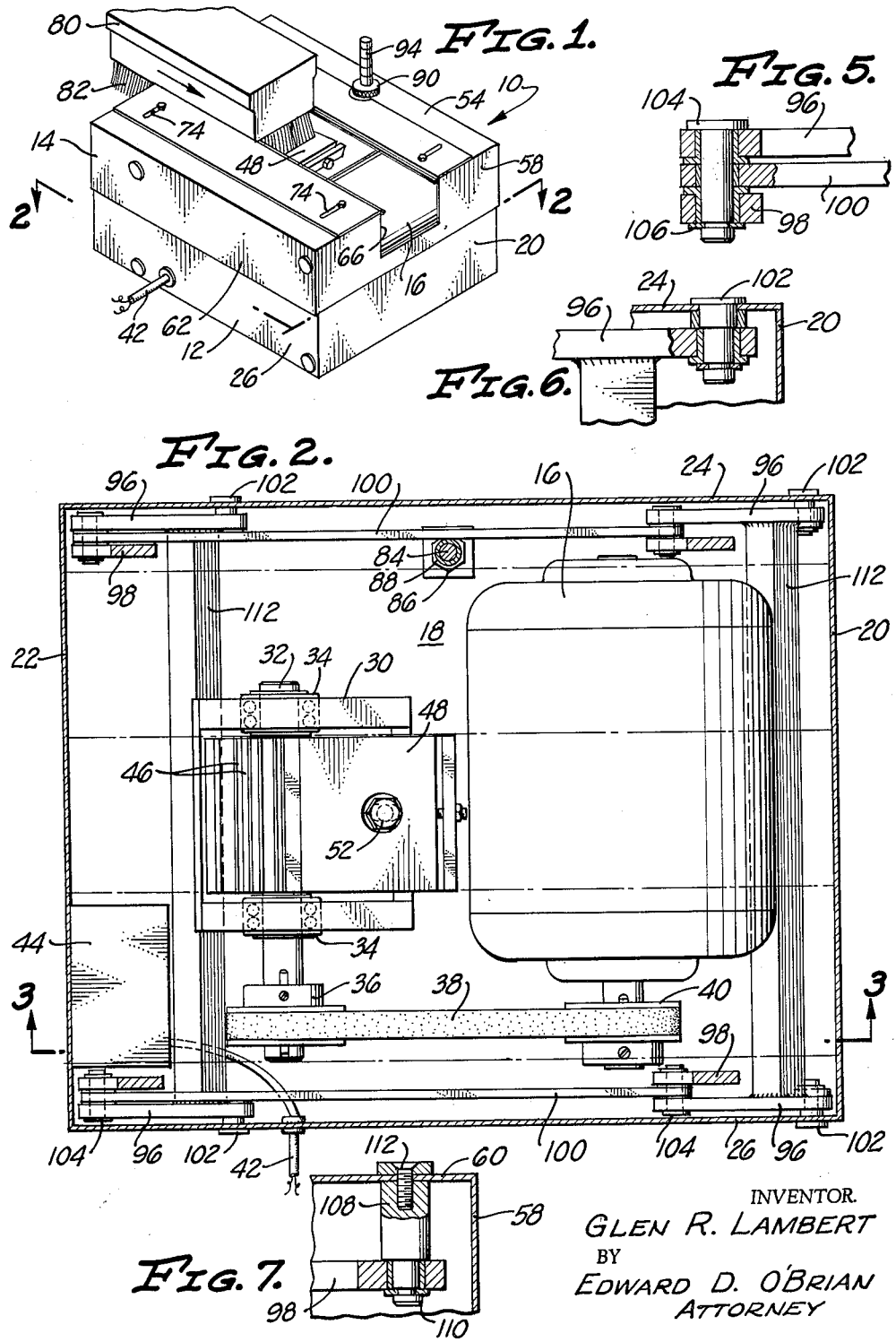
INVENTOR.
GLEN R. LAMBERT
BY
EDWARD D. O'BRIAN
ATTORNEY July 13, 1965  G. R. LAMBERT  3,194,604
BRUSH TRIMMER Filed Aug. 5, 1963  2 Sheets-Sheet 2

INVENTOR.
GLEN R. LAMBERT
BY
EDWARD D. O'BRIAN
ATTORNEY 3,194,604
BRUSH TRIMMER
Glen R. Lambert, 16512 Kettler Lane,
Huntington Beach, Calif.
Filed Aug. 5, 1963, Ser. No. 299,891
4 Claims. (Cl. 300—17)

This invention is directed to a brush trimmer particularly designed for the trimming of bristles on brushes.

It is well known in the art of manufacturing brushes that the bristles must be trimmed to the proper length, and to an even length after the application and insertion of the bristles into the back of the brush. When brushes are manufactured, bristles of substantially random length are inserted and secured therein and in order to bring the bristles to even length, so that the brushes operate correctly and are of good appearance, it becomes necessary to trim the bristles. Brush trimming heads are known in the art. Such heads comprise a mandrel carrying shear cutting blades rotating beneath a fixed shear blade. As the brush is passed in the correct proximity to the cooperating shear blades, the bristles are trimmed to the proper length. This invention is directed to providing a housing for the bristle cutting head and its power source to provide an appropriate enclosure therefor, and to provide guide means for guiding the brush in correct proximity to the cutting head.

Accordingly it is an object of this invention to provide a suitable housing for a brush trimming shear head, the housing providing guide means for a brush in proximity to the brush trimming head, the housing further providing a substantially complete closure for neat appearance and for safety of the operating personnel.

It is another object of this invention to provide a closure for the brush trimmer which is fully adjustable both with respect to the length of the brush bristles desired on the finished brushes and with respect to the width of the brushes to be trimmed.

It is another object of the invention to provide a brush trimmer which is economic and sturdy so that it will enjoy a long, trouble free life in the rigors of industrial usage.

Other objects and advantages of this invention will become apparent upon study of the following specification and the attached drawings in which:

FIG. 1 is an isometric view of the brush trimmer of this invention;

FIG. 2 is a horizontal section looking downward along the line 2—2 of FIG. 1;

FIG. 5 is a detailed section taken along the line 5—5 of FIG. 3;

FIG. 6 is a detailed section of a portion of the linkage used in the adjustment of this brush trimmer; and FIG. 7 is another detailed section of a portion of the linkage used in this brush trimmer.

In summary, this invention is directed to a brush trimmer. The brush trimmer has a lower housing which contains the brush trimmer head and a motor for driving it. The brush trimmer head comprises a rotary element having a plurality of shear knife blades cooperating with a relatively stationary shear blade. An upper housing cooperates with the lower one to substantially completely enclose this equipment. Such enclosure is necessary for safety purposes to prevent one's fingers from coming too close to the rotary shear equipment or the power supply therefor. The upper half of the housing carries guide means for brushes to be trimmed and the guide means is adjustable for various widths of brushes. The upper housing half is vertically adjustable to adjust the relationship between the guide means and the shear cutting equipment so that the cut bristle length can be adjusted for various types and sizes of brushes. An appropriate linkage and adjustment control means is provided to adjustably yet rigidly support the upper housing half relative to the lower housing. This linkage comprises a double parallelogrammic structure on each side, appropriately interlinked so that all links move together for even action. A vertical screw post adjusts the vertical position of the upper housing half and provides for further stability. The vertical screw post further includes indicia for indicating the length of bristles after cutting. Accordingly, adjustment can be readily made and brush bristle length promptly and easily established.

Figure 3:
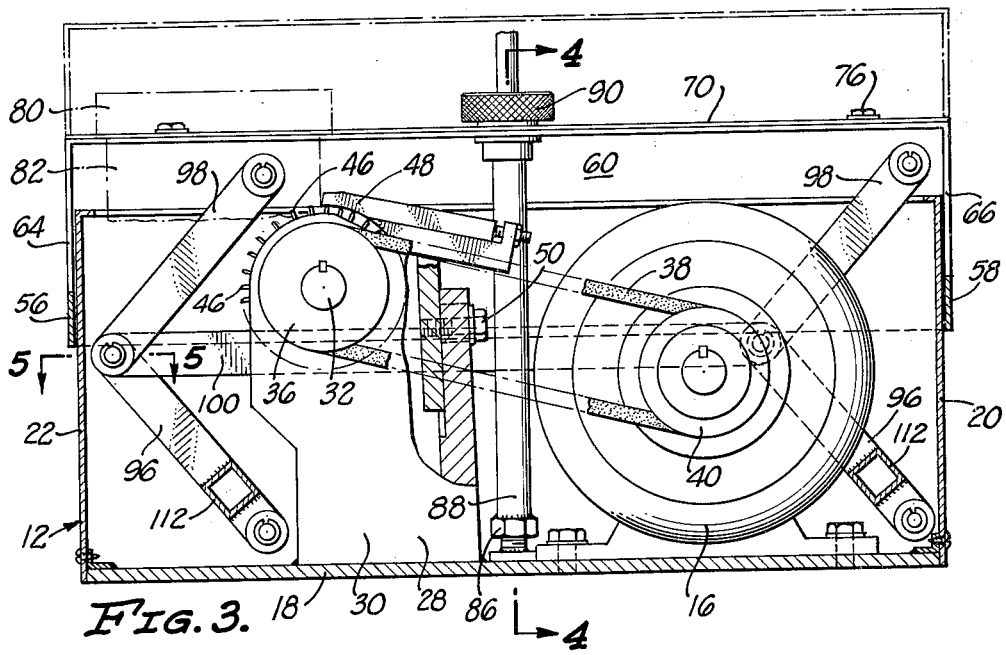
FIG. 3 is a side elevational section taken along the line 3—3 of FIG. 2.
Figure 4:
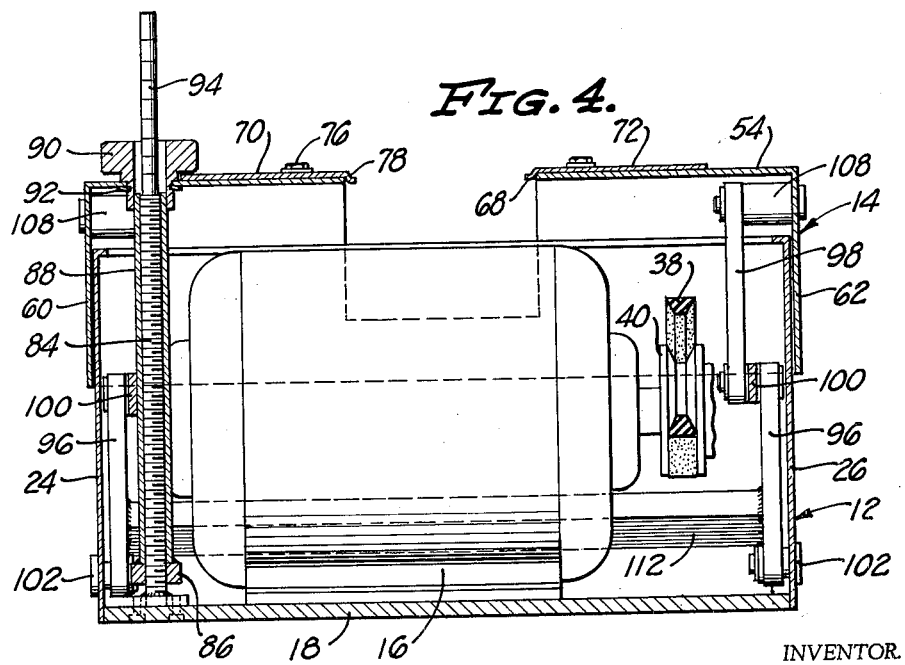
FIG. 4 is an end elevational section taken along the line 4—4 of FIG. 3.

Further and more detailed understanding of the invention will be clear from a study of the following portion of this specification wherein the drawings are described in detail. Referring now to FIG. 1, the brush trimmer is generally shown at 10. As has been previously described, the brush trimmer 10 comprises a lower housing 12 and an upper, vertically adjustable housing 14. As is better seen in FIGS. 2, 3 and 4, the lower housing 12 contains an electric motor 16 secured therein for furnishing power to the brush trimmer. Alternatively other power means than electric motor 16 may be used, such power means including air motors or hydraulic motors, and any of these power means may be located externally of the brush trimmer 10, if desired. For example, the base 18 of the lower housing 12 may have a suitable slot therethrough for providing a belt connection from an exterior power supply which may be mounted on a bench beneath the brush trimmer 10. However, it is considered more desirable to have the power supply, such as electric motor 16, within the brush trimmer 10 so that the brush trimmer is a unitary structure.

The lower housing 12 comprises the base 18, end walls 20 and 22 and side walls 24 and 26. The end and side walls are preferably of lighter construction than the base 18, for the base serves as the main structural member of the entire brush trimmer. The end and side walls may be screwed or welded to the base 18 in such a manner as to provide a rigid, substantial base suitable for rigid mounting of equipment therein. Additionally, to the motor 16, the shear head 28 is mounted therein. The shear head 28 comprises a base 30 which carries a shaft 32 rotatably mounted therein, such as by means of ball bearings 34. Mounted on the shaft 32 is a sheave 36 suitable for use with a V belt 38 which is driven by the motor sheave 40, mounted upon the drive shaft of the motor 16. Thus, energization of the motor 16 by means of supplying power to it through electrical leads 42 rotates the shaft 32. If desired, an electric box 44 may contain a switch for control of the motor 16.

Mounted upon the shaft 32 in the shear head 28 is a cylinder carrying rotatory shear blades 46. Mounted on the shear head 28 is a stationary shear blade 48 which cooperates with the rotatory shear blades 46 to provide shearing action. Vertical adjustability of this stationary shear blade 48 is provided by the adjustable construction secured by the clamp bolt 50 and horizontal adjustment of the stationary shear blade 48 is available through construction secured by clamp bolt 52.

When the rotary and stationary shear blades 46 and 48 are arranged for proper cooperation with each other and are driven by the motor 16, all that needs to be done is to position the brush bristles in correct proximity thereto for shearing.

The upper housing 14 has a top 54 and end walls 56 and 58 depending therefrom. Similarly, side walls 60 and 62 depend therefrom. These walls together with the top 54 provide a rigid rectangular box-like structure with an open bottom. The dimensions are such that the side walls 60 and 62 are able to pass outside of the side walls 24 and 26 of the lower housing 12. Similarly, the end walls 56 and 58 pass outside of the end walls 22 and 20 of the lower housing 12. Thus the upper housing is able to pass downwardly over the outside of the lower housing. Hereinafter described vertical adjustment means and vertical stabilizing means describes how vertical stability is obtained. The end wall 56 and 58 of the upper housing have rectangular openings 64 and 66 therein. Similarly the top 54 has a slot 68 therethrough corresponding to the rectangular openings 64 and 66 to provide a passage for the brush bristles through the upper housing 14 toward and away from the shear head 28. Secured to the top 54 are guides 70 and 72 which have slots 74 therein through which bolts 76 pass. The heads of the bolts 76 engage on top of the guides 70 and 72, and the threads engage within the top 54, or in nuts secured thereto. The guides 70 and 72 are thus adjustable across the opening 68 to substantially completely close it. The edges of the guide 70 and 72 closest to the slot 68 have a double bend therein to form a depending L 78 for the guidance of the backs of brushes. Thus the L guides 78 may be adjusted inwardly to accommodate different widths of backs and brushes, the bristles of which are being trimmed on the brush trimmer.

As seen in FIG. 1, brushes are normally provided with rectangular backs 80 into which the bristles 82 are inserted and secured. In the manufacture of such brushes, it is substantially impossible and is certainly impractical to insert the bristles such that the ends are of a uniform length. The purpose of the present invention then is to accept such brushes at the intermediate stage of manufacture and trim the bristles 82 to a uniform length. The backs 80 are of generally rectangular configuration and are suitable for guidance in the L guide 78. By the edgewise adjustability of the guides 70 and 72 in accordance with the L guide 78, the particular brush width is accommodated.

In order to establish the proper trimmed length of the bristles 82, the entire upper housing is vertically adjustable. Adjustment is accomplished by the use of a screw 84 secured to the base 18. Engaged with the screw 84 is a nut 86 to which is secured a tube 88. The tube is of sufficient inside diameter to clear the outside of the threads on the screw. Knob 90 is secured to the top of the tube 88 in such a manner as to rotate the tube and thus rotate the nut 86. Such rotation causes elevation or descension of the nut 86 on the screw 84 for the vertical adjustment of knob. The knob 90 passes through the top 54 and has a ring 92 therebelow for the purpose of supporting the top 54. Accordingly the top 54 and the entire upper housing 14 is moved up and down in accordance with the rotation of the knob 90. Secured to the top of the screw 84 is an extension 94 which carries indicia to indicate the particular height of the upper housing 14. These indicia are arranged in such a manner as to indicate the length of trimmed bristles. Accordingly the vertical adjustment for proper bristle length may be easily established.

In order to cause the upper housing 14 to move in uniform manner with the adjustment of the knob 90, a linkage is provided within the upper and lower housings. As will be seen, the linkage is secured to the two housings and is interlinked together so that uniform motion takes place. There are four identical lower links 96 and four identical upper links 98. Two identical cross links 100 are also provided. As is seen in FIGURE 6, bearing pin 102 is removably secured in the lower corner of the lower side 24 and the lower link 96 is pivotally mounted thereon. Such a pin 102 is mounted at the lower end of each of the links 96 in such a fashion as to permit rotation of the links 96 therearound. As is seen in FIGURE 5, the upper end of the lower link 96 is bearingly mounted on pin 104 which also carries the lower end of the upper link 98 and one end of each cross link 100. The pin 104 is suitably provided with bearing means and securing means such as snap ring 106.

The manner in which the upper link is secured to the upper housing 14 is shown in FIGURE 7. Here again a pin 108 is secured in the housing, in this case in the top side wall 60 and carries the upper end of the link 98 on a suitable bearing. The upper link 98 is secured on the pin 108 by means of a snap ring 110 and the pin 108 is secured in the top side wall 60 by having a screw 112 pass through a washer on the outside of the wall 60 into the pin 108 on the inside of the wall 60. This manner of fastening is for the purpose of convenient disassembly of the unit so that the upper housing 14 may be removed from the lower housing 12 for maintenance purposes. It is clear from the drawings that there are four lower links 96 secured in the lower side walls and four upper links 98 secured in the upper side walls so there are four points of control for the upper housing, beyond the adjustment provided by the adjusting knob 90. In order that the links act together for uniform rectilinear movement of the upper housing 14, the links at the opposite ends of the housing are connected by the cross links 100. Additionally, the lower links on opposite sides of the lower housing are transversely connected by means of a rectangular torque bar 112. One such torque bar 112 is at each end of the lower housing and is secured between the lower links 96. Thus the opposite lower links 96 must rotate together about their pins 102. The torque bars 112 are rigidly secured to the lower links 96, as by welding or other convenient means.

When the knob 90 is turned, for example in a direction suitable to raise the upper housing 14 to increase the length of bristles to be cut, the upward force of the knob 90 upon the top 54 causes actuation of the linkage. Since the linkage is connected throughout by means of the cross links 100 and the torque bars 112, all links act together and the entire upper housing moves uniformly upward to keep in proper relation to the lower housing for convenient and accurate adjustability. Similarly, as has been previously described, the guide plates 70 and 72, carrying the L shaped guide 78 are adjustable in a widthwise direction for the support of the brush back. Accordingly, adjustments for varying brush sizes can be readily, conveniently and accurately made by means of this housing structure, and at the same time the housing provides safety by providing a substantial enclosure for the equipment enclosed therein.

This invention having been described in its preferred embodiment, it is apparent that numerous modifications and changes can be made without departing from the spirit and scope of the invention and without the exercise of the inventive faculty. Accordingly, the scope of this invention is defined by the scope of the following claims.

I claim:
1. A brush trimmer, said brush trimmer comprising:
   a lower housing, said lower housing having a bottom, first and second side walls and first and second end walls;
   a brush trimming shear head rotatably mounted within said lower housing adapted for the cutting of brush bristles, power means mounted within said lower housing and connected to drive said shear head;
   an upper housing, said upper housing having a top, first and second end walls and first and second side walls depending from said top, said end walls and said side walls of said upper housing respectively cooperating with said end walls and said side walls of said lower housing to substantially enclose said shear head and said power means for the prevention of inadvertent access thereto; and
   guide means on said top of said upper housing, said guide means being arranged for the guidance of brushes, said guide means being positioned with respect to said shear head so that when brushes are guided along said guide means the bristles of the brushes are trimmed in accordance with the relationship of said top of said upper housing with respect to said shear head.

2. The structure of claim 1 wherein said brush guide means are L-shaped guides mounted for adjustment with respect to each other to accommodate varying brush widths, said L-shaped guides being adapted to engage the back of a brush for guidance of the brush with respect to said shear head.

3. The structure of claim 2 wherein the adjustment means of said upper housing with respect to said lower housing includes linkage connected between said upper housing and said lower housing to cause uniform rectilinear motion of said upper housing with respect to said lower housing and means to secure said upper housing with respect to said lower housing after adjustment is accomplished.

4. The structure of claim 3 wherein said linkage includes at least three lower links pivoted to said lower housing and at least three upper links pivoted to said upper housing, each one of said lower links being pivoted to one of said upper links and a cross link pivoted to two of said links so that when one end of said upper housing is moved with respect to said lower housing, the other end of said upper housing is also so moved.

References Cited by the Examiner
UNITED STATES PATENTS

| | | | |
|---|---|---|---|
| 132,031 | 10/72 | Stone | 300—17 |
| 913,523 | 2/09 | Lebherz | 300—17 |
| 1,410,554 | 3/22 | Dernbach | 145—4 |
| 2,351,344 | 6/44 | King | 300—17 |

GRANVILLE Y. CUSTER, JR., *Primary Examiner.*